US008797672B2

(12) United States Patent
Tanabe et al.

(10) Patent No.: US 8,797,672 B2
(45) Date of Patent: Aug. 5, 2014

(54) DYNAMIC TRACK PITCH CONTROL FOR SHINGLED MAGNETIC RECORDING (SMR)

(75) Inventors: Hiroyasu Tanabe, Yokohama (JP); Hideki Zaitsu, Fujisawa (JP); Kyo Akagi, Fuchu (JP); Naoto Ito, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 69 days.

(21) Appl. No.: 13/523,657

(22) Filed: Jun. 14, 2012

(65) Prior Publication Data

US 2013/0335856 A1 Dec. 19, 2013

(51) Int. Cl.
G11B 21/02 (2006.01)
G11B 15/18 (2006.01)
G11B 5/027 (2006.01)

(52) U.S. Cl.
USPC ................... 360/75; 360/58; 360/71

(58) Field of Classification Search
None
See application file for complete search history.

(56) References Cited

U.S. PATENT DOCUMENTS

| 5,583,727 A * | 12/1996 | Parkin ........................... 360/324 |
| 6,437,947 B1 | 8/2002 | Uno |
| 6,611,395 B1 | 8/2003 | Chainer et al. |
| 7,102,838 B2 | 9/2006 | Kim et al. |
| 7,440,221 B2 * | 10/2008 | Tsuchinaga et al. ........ 360/77.01 |
| 7,852,587 B2 * | 12/2010 | Albrecht et al. ................. 360/59 |
| 7,898,755 B2 | 3/2011 | Mochizuki et al. |
| 8,270,256 B1 * | 9/2012 | Juang et al. ................. 369/13.01 |
| 2010/0277827 A1 | 11/2010 | Wood et al. |
| 2013/0188275 A1 * | 7/2013 | Isokawa et al. ................. 360/75 |

* cited by examiner

Primary Examiner — K. Wong
(74) Attorney, Agent, or Firm — G. Marlin Knight

(57) ABSTRACT

SMR disk drives are described that adjust track pitch or magnetic write width to compensate for external temperature effects. In one embodiment track pitch is increased when the media temperature increases. The temperature of magnetic media during write operations can be determined from the drives' temperature sensor. In other embodiments track pitch is adjusted based on the magnetic write width (MWW) which is determined from read-back testing of previously written data tracks. In an alternative embodiment, the width of the MWW is adjusted instead of the track pitch. The various factors that affect the MWW that can be used to increase or decrease the MWW, including write current characteristics and when available thermal-assistance parameters.

15 Claims, 5 Drawing Sheets

Using variable track pitch, overwritten track 43 is protected from being narrowed by track 44.

ial density of magnetic recording. In shingle-written magnetic recording (SMR) media a region (band) of adjacent tracks are written so as to overlap the previously written track. The shingled tracks must be written in sequence unlike conventionally separated tracks, which can be written in any order. The tracks on a disk surface in an SMR drive are organized into a plurality of shingled regions (also called I-regions) which can be written sequentially from an inner diameter (ID) to an outer diameter (OD) or from OD to ID. Once written in the shingled structure, an individual track cannot be updated in place, because that would overwrite and destroy the overlapping tracks. Shingle-written data tracks, therefore, from the user's viewpoint are sometimes thought of like append-only log structures. To improve the performance of SMR drives, a portion of the media is allocated to so-called "exception regions" (E-regions) which are used as staging areas for data which will ultimately be written to an I-region. The E-region is sometimes referred to as an E-cache. E-regions can optionally be shingled as well.

DYNAMIC TRACK PITCH CONTROL FOR SHINGLED MAGNETIC RECORDING (SMR)

FIELD OF THE INVENTION

The invention relates to the field of design and operation of shingle-written magnetic recording (SMR) devices.

BACKGROUND

Conventional disk drives with magnetic media organize data in concentric tracks that are spaced apart. The concept of shingled writing is a form of perpendicular magnetic recording and has been proposed as a way of increasing the areal density of magnetic recording. In shingle-written magnetic recording (SMR) media a region (band) of adjacent tracks are written so as to overlap the previously written track. The shingled tracks must be written in sequence unlike conventionally separated tracks, which can be written in any order. The tracks on a disk surface in an SMR drive are organized into a plurality of shingled regions (also called I-regions) which can be written sequentially from an inner diameter (ID) to an outer diameter (OD) or from OD to ID. Once written in the shingled structure, an individual track cannot be updated in place, because that would overwrite and destroy the overlapping tracks. Shingle-written data tracks, therefore, from the user's viewpoint are sometimes thought of like append-only log structures. To improve the performance of SMR drives, a portion of the media is allocated to so-called "exception regions" (E-regions) which are used as staging areas for data which will ultimately be written to an I-region. The E-region is sometimes referred to as an E-cache. E-regions can optionally be shingled as well.

In SMR drives the effective writing width of the write head is wider than the effective reading width of the read head. The width of the final data track in a region is typically made adjustable by the parameter settings of the SMR drive. For example, the track width can be made wider by having less overlapping of the next track. To maximize data storage capacity, narrower tracks are desired, but tracks should not be made so narrow that data is corrupted during the write of the adjacent shingled track.

The temperature of the magnetic media at the time of data writing affects the permeability of the magnetic media. At higher magnetic media temperature, the same write head magnetic field will write a wider data track because the switching threshold of magnetic media grains is lowered. Similarly a lower magnetic media temperature requires a stronger magnetic field to switch polarity of the grains so the same magnetic field generated by the write head will result in a narrower track width.

Thermal-assisted recording (TAR) uses a write head with a heater element for temporarily heating the magnetic media to enable smaller magnetic media grains to be written with a weaker magnetic field. However, the power and/or focus of the heater element can change with time or deterioration of the write head and alter the temperature of the media during write operations.

Changes in environmental temperature can cause the magnetic write width (MWW) to change in shingled magnetic recording (SMR). The magnetic data width when written at a low temperature can be narrower than desired track width. Additional complications arise when write heads with thermal assistant elements (e.g. TAR and microwave-assisted magnetic recording (MAMR)) are used since the outputs of these elements can deteriorate with age.

U.S. Pat. No. 7,898,755 to Mochizuki, et al. (Mar. 1, 2011) describes a method for measuring write width and/or read width of a composite magnetic head. A write sensitive width is calculated by writing test data by moving the write head in a radial direction of a magnetic recording medium at a designated speed to obliquely cross a designated track or a track adjacent to the designated track. Then reading the test data recorded in the track obliquely by a read head to obtain a read characteristics profile of a read voltage with respect to the track scanning time. A moving distance is obtained in the radial direction of the head by multiplying the test data scanning time of the read head with the designated moving speed.

U.S. Pat. No. 7,102,838 to Kim, et al. (Sep. 5, 2006) describes a method of optimizing a recording current in consideration of operating temperatures of a hard disk drive and a method of setting a recording density in consideration of tracks per inch (TPI) or adjacent track erasure (ATE) characteristics. Kim describes the conventional method of optimizing the write current or an overshoot current according to the temperature of the hard disk drive. The write current or the overshoot current is increased at low temperatures. The rate of errors under a test condition corresponding to the operating temperature of a hard disk drive is measured, while changing a recording parameter. The recording parameter value corresponding to a smallest rate of errors is selected.

U.S. patent application 20100277827 by Wood, et al. (Nov. 4, 2010) describes adjusting the amount of current to a magnetic-recording head of the HDD to cause a change in the strength of a magnetic write field produced by the magnetic-recording head in response to a determination that a present position of the magnetic-head head is not in a desired position. If the magnetic-recording head is further away from an edge of a current track being written than desired, the current to the magnetic-recording head is increased to cause an increase in the strength of the magnetic write field. In one embodiment, a laser is directed at the location on the surface of the disk to assist the writing process. This gives control over the temperature and the size of the heated area. Wood, et al. notes the relationship between the temperature of the surface of the magnetic-recording disk and the strength of the magnetic write field required to write to the heated portion of the magnetic-recording disk.

In U.S. Pat. No. 6,611,395 to Chainer, et al. (Aug. 26, 2003) the concept of adaptive track density in servowriting process for a non-SMR disk drive is described. The servowriting occurs as part of the initial manufacturing process and is not used to dynamically adjust to field conditions such as the temperature of the drive. In Chainer's method the servo-track pitch for each magnetic disk surface in a hard drive can be adaptively adjusted to take into account static variations in magnetic media characteristics, as well as, actual effective write and read head dimensions. The track pitch can also vary among separate bands of data tracks on a single side of a single disk.

U.S. Pat. No. 6,437,947 to Uno (Aug. 20, 2002) describes variations in the overlapping region of two adjacent data tracks based on geometry of disk components. Signals are recorded on and reproduced from a magnetic disk by a head with an azimuth angle which changes depending on a radial position on the magnetic disk. The magnetic disk includes a first recording region having tracks recorded with an azimuth angle less than or equal to a predetermined value, a second recording region having tracks recorded with an azimuth angle greater than the predetermined value, and an overlapping region in which two mutually adjacent tracks overlap in a radial direction of the magnetic disk, where a track pitch of the tracks within the first recording region is different from a track pitch of the tracks within the second recording region.

SUMMARY OF THE INVENTION

One SMR drive embodiment of the invention adjusts track pitch to compensate for external temperature effects. This allows SMR data track widths to change depending on the magnetic media's temperature at the time of writing of the data. In prior art SMR drives attempt to keep data track pitch constant by physically positioning the head at a selected distance from a previously written adjacent track center. However, because magnetic write width (MWW) varies with temperature, the effective data track width will vary as well and can result in a subsequent shingled track overlapping the previous track more than desired.

In some embodiments of the invention the temperature is used to select a track pitch for the next series of write operations. Higher temperatures generally mean that a higher track pitch is needed to allow for wider MWW, while lower temperatures lead to a narrower MWW and a smaller track pitch according to the invention. The selected track pitch results in protection of a previously written track from being excessively narrowed. The track pitch is a function of the temperature so that the maximum allowed track pitch is selected for the maximum allowed temperature range. Similarly the minimum allowed track pitch is selected for the lowest allowed temperature range. In embodiments of the invention after temperature of media is determined, the SMR drive can change its parameters to adjust the desired data track pitch for subsequent shingled writes.

The approximate temperature of magnetic media during write operations can be determined by a temperature sensor. In alternative embodiments the magnetic write width (MWW) is measured instead of temperature. The MWW can be determined from reading back test written data tracks. In one embodiment the current magnetic write width (MWW) is determined by performing test writes in a free area and then the measuring the MWW, which is then used to set the track pitch offset appropriately for the actual MWW. A free area in an E-region can conveniently be used for the test writes. The parameter table used during write operations is updated accordingly. The adjustment of the track pitch can be performed at predetermined intervals, by event detection or upon demand when testing of the current performance of the device is desired.

In another alternative embodiment, the width of the MWW is adjusted instead of the track pitch. The various factors that affect the MWW that can be used to increase or decrease the MWW toward a target value. The factors include write current characteristics and when available thermal-assistance parameters.

DETAILED DESCRIPTION OF THE INVENTION

Figure 1:
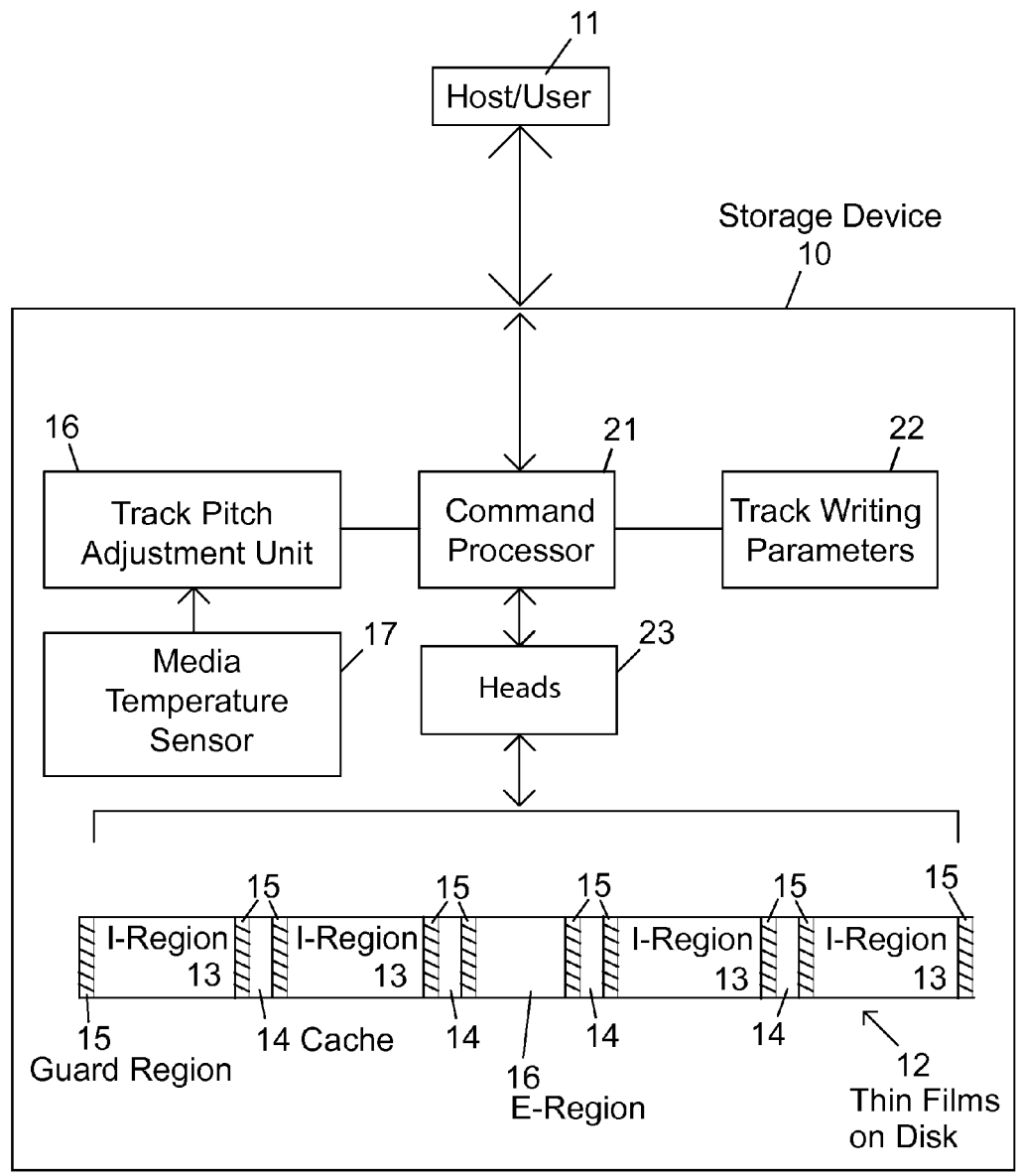
FIG. 1 is an illustration of a data storage device with a track pitch adjustment system according to an embodiment of the invention.

FIG. 1 is an illustration of an SMR data storage device 10 with a command processor 21 and track pitch adjustment unit 16 according to an embodiment of the invention. The data storage device 10 functions according to the prior art except as described herein, and aspects of the system that perform prior art functions are not shown. The host/user 11 can be any type of computer-like device and can communicate with the drive by any means including through a network. The term "user" will be used interchangeably with "host." Multiple hosts can also communicate with the drive using prior art techniques.

The system electronics can be included in a prior art system-on-a-chip, which is an integrated circuit that includes the command processor 21, the track pitch adjustment unit 16 and nonvolatile memory for the track writing parameters 22, as shown as well as prior art host interface, controller, servo functions, microprocessor, firmware programs, etc. all in a single chip. In alternative embodiments the track pitch adjustment unit is replaced by a magnetic write width adjustment unit as will be described below.

The heads 23 include read and write heads for each disk surface. Thin films 12 are magnetic thin film coatings, which typically are deposited on both upper and lower surfaces of a hard disk (not shown) and a drive can also have multiple disks. The films 12 are shown in FIG. 1 in cross section view. In a plan view, the regions are a plurality of concentric circular bands that pass under the heads as the disks are rotated. The magnetic thin films are formatted for use in an SMR architecture and in this embodiment include disk E-region 16, I-regions 13 (also called I-track regions), write cache regions 14 (also called write-twice cache regions), and guard regions or bands 15. Although only one is shown in FIG. 1, a device can have multiple E-regions 16 on each disk surface, and there are usually multiple disk surfaces.

The track writing parameters 22 are updated according to output from the track pitch adjustment unit 16. The embodiment shown in FIG. 1 includes optional media temperature sensor 17 which can be any standard type of sensor such as a thermistor. The media temperature sensor 17 should be positioned in the drive in a location that provides a good representation of the temperature of the thin films 12 on the disk(s) but need not be in contact with the rotating disks. In alternative embodiments the MMW can be measured by read/write testing instead of or in addition to using the temperature sensor.

Figure 2:
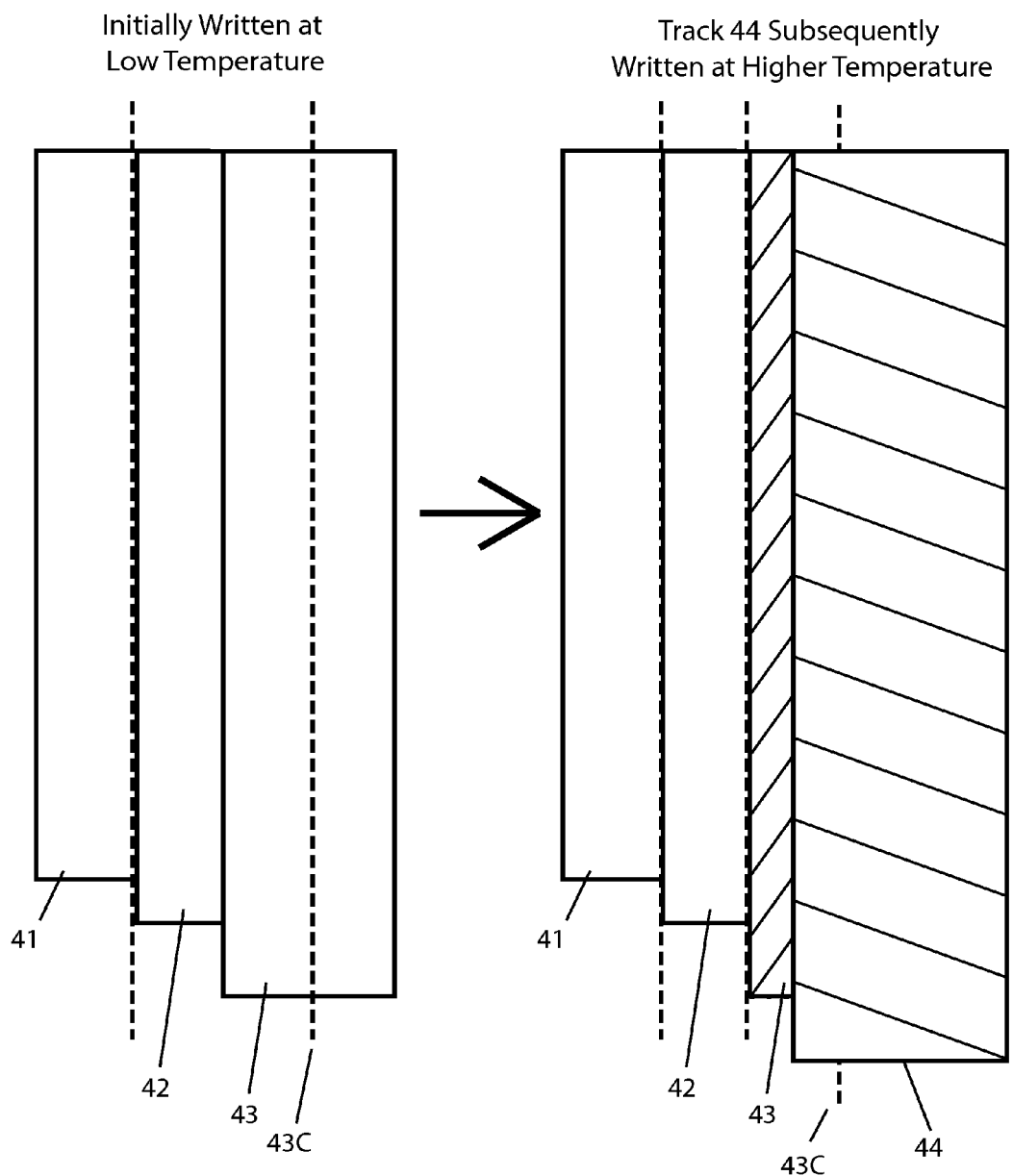
FIG. 2 is an illustration of the track pitch problem addressed by the invention.

FIG. 2 is an illustration of the problem addressed by the invention. On the left side of the figure, tracks 41-43 have been written in shingled order at a time when the media temperature is at a relatively low value using a predetermined track pitch. In this example the tracks are each written to overlap the previous track by about 50%. The approximate centerline of track 43 is illustrated by dashed line 43C. There is an assumed gap in time after track 43 has written before the subsequent track 44 is written. The right side of the figure shows what happens at a latter time when the temperature of the media has increased and track 44 is written using the same track pitch as was used at the lower temperature. The higher temperature results in the MWW of track 44 being wider than track 43. Therefore, the readable area of track 43 has been reduced below the target 50% value making it potentially unreliable.

Figure 3:
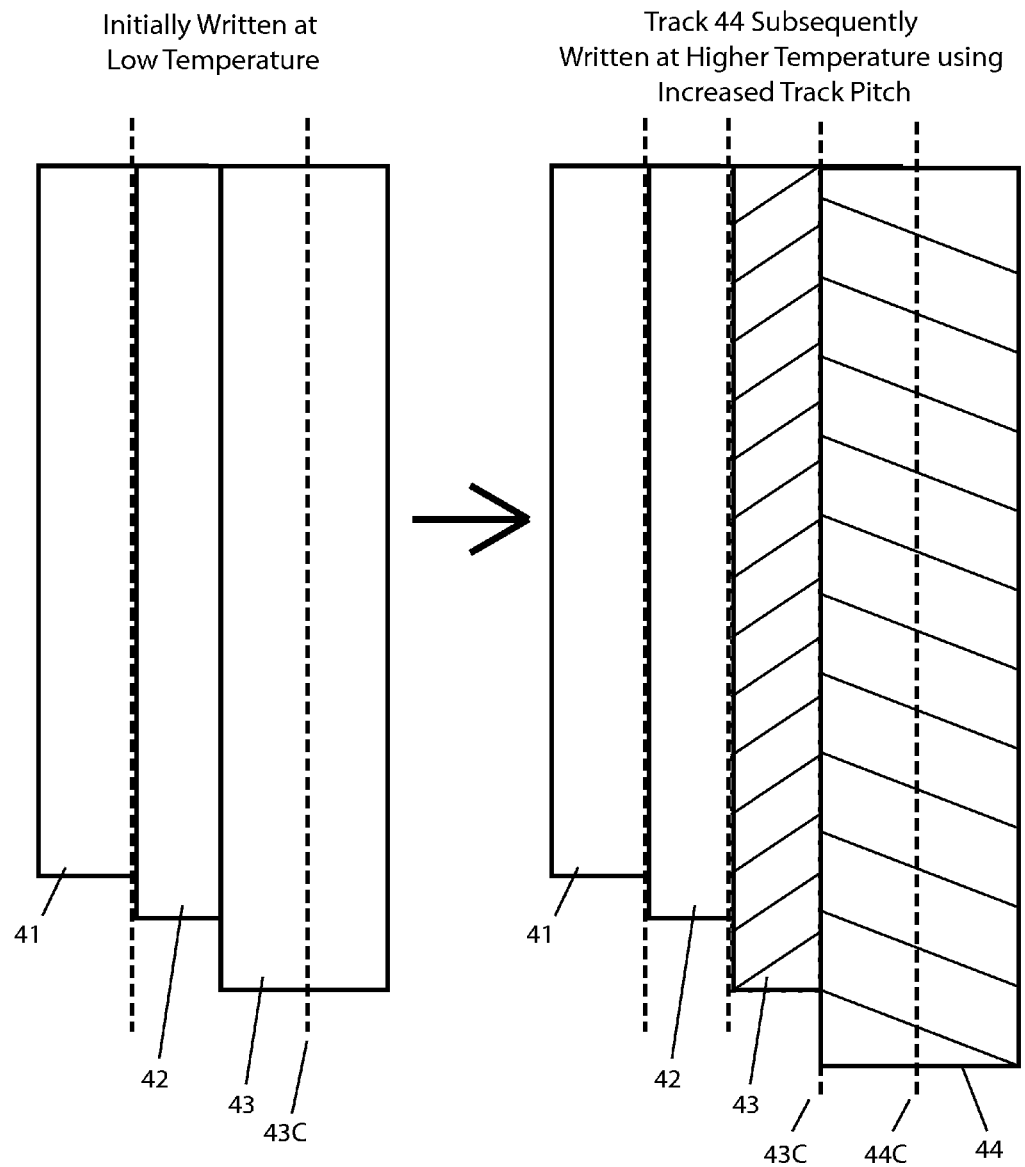
FIG. 3 is an illustration of how the track pitch problem is solved in one embodiment of the invention by increasing the track pitch when the media temperature increases.

FIG. 3 is an illustration of how the track pitch problem is solved in one embodiment of the invention by increasing the track pitch when the media temperature increases. In this embodiment the increased temperature causes the device to increase the track pitch between track 43 and track 44. Therefore, the centerline 44C has a greater separation from the centerline 43C than would be the case without the temperature-based track pitch adjustment according to the invention. In one embodiment the increase in the track pitch is selected to offset approximately half of the increase in the MWW between two temperatures, to result in an approximately constant percentage of the previously written track being overwritten.

Figure 4:
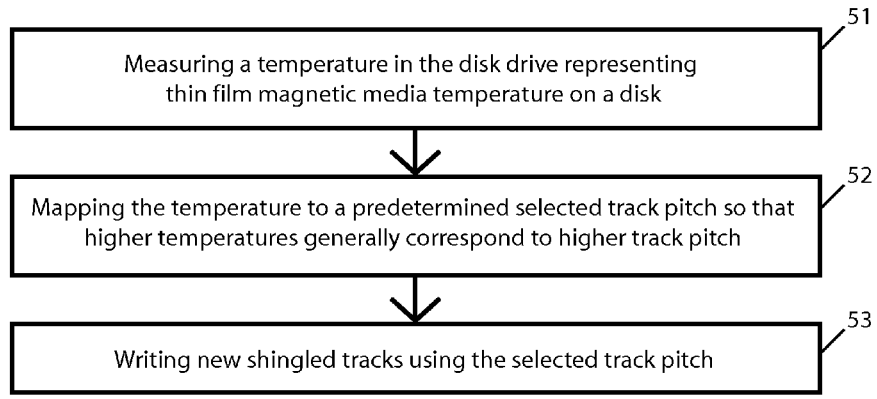
FIG. 4 is a flow chart illustrating a method of adjusting the track pitch in one embodiment of the invention by increasing the track pitch when the media temperature increases.

FIG. 4 is a flow chart illustrating a method of adjusting the track pitch in one embodiment of the invention by increasing the track pitch when the media temperature increases. The selected temperature that is representative of the media temperature is measured 51. The temperature can be measured periodically or triggered by a selected event, but it does not need to measured before every write operation. The relevant temperature to determine for adjustment of the track pitch is the temperature at the time new data is written; e.g., when writing track_N+1, the temperature during the write of track_N+1 is the important temperature. The temperature during the write of track_N is not important due to the shingling progression of the SMR data writes, e.g., for geometric sizes of the write-head, read-head, and overlap area.

The next phase is to map the temperature to a predetermined selected track pitch or equivalent track writing parameters 52. The updated track pitch is then used for writing shingled tracks until the next update occurs. The mapping makes higher temperatures generally correspond to higher track pitch values. The mapping can be in discrete increments so that some range of values of temperature map to a single track pitch. The range of temperature variations can be mapped into discrete increments of track pitch that can be achieved using the drive's servo system.

The means available to command processor and/or track pitch adjustment unit for mapping the current temperature into specific track writing parameters can be a lookup table with empirically predetermined values or equivalently a formula or algorithm that yields comparable results. The exact values must be determined empirically for the design of the drive.

The track pitch is a function of the temperature so the maximum allowed track pitch is selected for the maximum allowed temperature range. Similarly the minimum allowed track pitch is selected for the lowest allowed temperature range.

Figure 5:
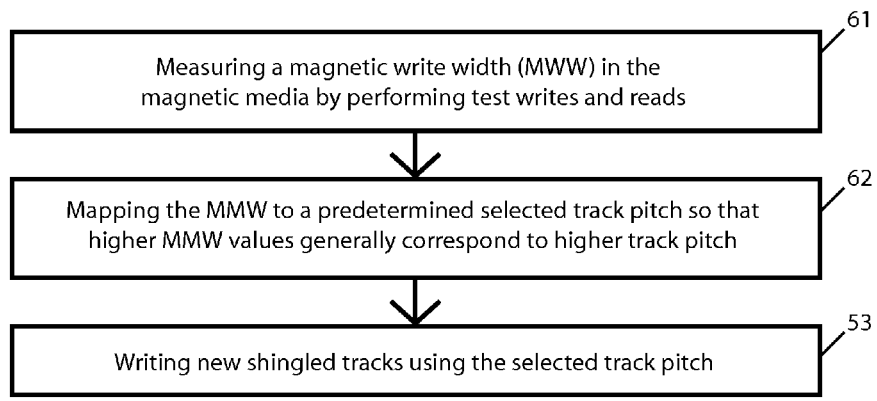
FIG. 5 is a flow chart illustrating a method of adjusting the track pitch in one embodiment of the invention using measured magnetic write width (MWW) determined by testing.

The current temperature can be detected by measurement using an optional sensor 17 as shown in FIG. 1. However, alternatively the track pitch adjustment unit 16 can perform test writes before writing actual data to determine the current MWW. FIG. 5 is a flow chart illustrating a method of adjusting the track pitch in one embodiment of the invention using measured magnetic write width (MWW) 61. The test writes can conveniently be performed in an E-region, which is a temporary storage area in the SMR architecture.

Once the current MWW is determined the track pitch in the track writing parameters can be adjusted accordingly based on predetermined empirical data for the drive design with higher MWW generally corresponding to high track pitch values 62. The increase in the track pitch from a first low MWW to a second higher MWW should be approximately one half of the increase in MWW to generally ensure that the increase in the MWW does not narrow the previously written track as illustrated in FIGS. 2 and 3.

Figure 6:
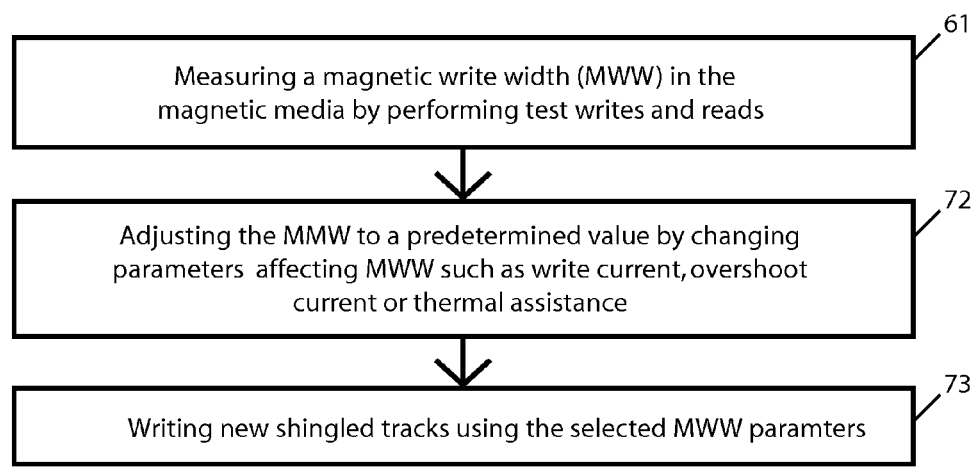
FIG. 6 is a flow chart illustrating a method of adjusting the magnetic write width (MWW) in one embodiment of the invention using measured magnetic write width (MWW) determined by testing.

In an alternative embodiment, the width of the MWW is adjusted instead of the track pitch. In this embodiment the track pitch adjustment unit is replaced by an MWW adjustment unit. In the method illustrated in FIG. 6, the current magnetic write width (MWW) is measured 61 as described above. There are various factors that affect the MWW that can be used to increase or decrease the MWW 72 as known in the prior art. For example, in a drive that uses thermal assistance, the temperature of the local spot of media being written can be adjusted up or down. Another method is to adjust the write current going to the write head. Yet another method is to adjust the overshoot current going to the write head. The newly selected MWW parameters are then used to write shingled tracks until the next MWW measurement is made 73.

The invention claimed is:

1. A method of operating a Shingled Magnetic Recording disk drive comprising:
    measuring a selected temperature in the disk drive, the selected temperature representing thin film magnetic media temperature on a disk; and
    selecting a track pitch for a next shingled write operation on the disk using the selected temperature, the selected track pitch being a positive function of the selected temperature that increases to a maximum track pitch corresponding to a maximum temperature and decreases to a minimum track pitch corresponding to a minimum temperature, the selected track pitch resulting in a partial overlapping of a previously written track by the next shingled write operation.

2. The method of claim 1 wherein a magnetic write width for the write operation varies with values of the selected temperature and the selected track pitch compensates at least in part for increases in the magnetic write width by increasing the selected track pitch for higher temperatures and decreasing the selected track pitch for lower temperatures.

3. The method of claim 2 wherein a first value of the selected temperature corresponds to a first magnetic write width and a second value of the selected temperature higher than the first value corresponds to a second magnetic write width higher than the first magnetic write width and selecting a track pitch for the second value of the selected temperature that higher than the track pitch for the first value by an amount approximately equal to one half of the difference between the first and second magnetic write widths.

4. A method of operating a Shingled Magnetic Recording disk drive comprising:
    measuring a current magnetic write width by performing test writes and reads in the thin film magnetic media on a disk; and
    selecting a track pitch for a next shingled write operation, the track pitch being a positive function of the current magnetic write width that compensates for increases in the current magnetic write width by increasing the track pitch up to a maximum track pitch that is selected for a maximum current magnetic write width and compensates for decreases in the current magnetic write width by decreasing the track pitch to a minimum track pitch that is selected for a minimum current magnetic write width, wherein the selected track pitch compensates for changes in the current magnetic write width.

5. The method of claim 4 wherein selecting a track pitch further comprises mapping changes in the current magnetic write width to changes in the selected track pitch so that the track pitch changes by an amount approximately equal to one half of the change in current magnetic write width.

6. A method of operating a Shingled Magnetic Recording disk drive comprising:
measuring a current magnetic write width by performing test writes and reads in the thin film magnetic media on a disk using a first set of writing parameters; and
adjusting the current magnetic write width to conform to a predetermined value by adjusting one or more writing parameters.

7. The method of claim 6 wherein adjusting the magnetic write width further comprises changing a write current parameter to increase or decrease the magnetic write width.

8. The method of claim 6 wherein adjusting the magnetic write width further comprises changing a thermal assist parameter to increase or decrease the temperature of the film magnetic media.

9. The method of claim 6 wherein adjusting the magnetic write width further comprises changing an overshoot current to increase or decrease the film magnetic write width.

10. A Shingled Magnetic Recording disk drive comprising:
temperature sensor for measuring a selected temperature representing magnetic media temperature on a disk; and
a track pitch adjustment unit that adjust the track pitch by selecting a track pitch value for a next write operation using the selected temperature, the selected track pitch value being a positive function of the selected temperature up to a maximum track pitch value that is selected for a maximum temperature and wherein a minimum track pitch value is selected for a minimum temperature, and the selected track pitch value results in a partial overlapping of a previously written track by the next write operation.

11. The Shingled Magnetic Recording disk drive of claim 10 wherein a magnetic write width for the write operation increases with the selected temperature and the track pitch adjustment unit adjusts for increases in magnetic write width by increasing the track pitch value.

12. The Shingled Magnetic Recording disk drive of claim 10 wherein the selected track pitch value is a function of the selected temperature so that the track pitch value increases with temperature by an amount approximately equal to one half of an increase in magnetic write width for first and second values of the selected temperature where the second value is higher than the first value.

13. A Shingled Magnetic Recording disk drive comprising:
magnetic media on a disk organized into at least one unshingled region and one shingled region; and
a track pitch adjustment unit that adjusts the track pitch by selecting a track pitch value for a next shingled write operation in the shingled region using a measured magnetic write width value determined by writing and reading test data in the magnetic media, the selected track pitch value being a positive function of the measured magnetic write width value up to a maximum track pitch that is selected for a maximum measured magnetic write width value and where a minimum track pitch is selected for a minimum measured magnetic write width, wherein the selected track pitch value compensates at least in part for changes in the magnetic write width value.

14. The Shingled Magnetic Recording disk drive of claim 13 wherein the selected track pitch value increases with magnetic write width values by an amount approximately equal to one half of an increase in magnetic write width for first and second values of the magnetic write width where the second value is higher than the first value.

15. A Shingled Magnetic Recording disk drive comprising:
magnetic media on a disk organized into at least one unshingled region and one shingled region; and
a magnetic write width adjustment unit that adjusts the magnetic write width by selecting write parameters for a next shingled write operation in the shingled region by measuring a first magnetic write width value determined by writing and reading test data in the magnetic media using a first set of write parameters, and then selecting a second set of write parameters to adjust the magnetic write width value to correspond to a predetermined target value.

* * * * *